(12) United States Patent
Zhao et al.

(10) Patent No.: US 11,664,763 B2
(45) Date of Patent: May 30, 2023

(54) SUPPORT FIXING STRUCTURE AND PHOTOVOLTAIC TRACKING MOUNTING SYSTEM

(71) Applicant: Zhejiang Ansant Technology Co., Ltd., Huzhou (CN)

(72) Inventors: Dong Zhao, Huzhou (CN); Gaofeng Liu, Huzhou (CN); Ziyi Yu, Huzhou (CN); Di Liu, Huzhou (CN)

(73) Assignee: Zhejiang Ansant Technology Co., Ltd., Huzhou (CN)

( * ) Notice: Subject to any disclaimer, the term of this patent is extended or adjusted under 35 U.S.C. 154(b) by 208 days.

(21) Appl. No.: 17/200,502

(22) Filed: Mar. 12, 2021

(65) Prior Publication Data

US 2022/0294384 A1 Sep. 15, 2022

(51) Int. Cl.
| | |
|---|---|
| *H02S 20/32* | (2014.01) |
| *H02S 20/30* | (2014.01) |
| *F16M 11/10* | (2006.01) |
| *F16M 11/18* | (2006.01) |

(52) U.S. Cl.
CPC ............ *H02S 20/32* (2014.12); *F16M 11/10* (2013.01); *F16M 11/18* (2013.01); *F16M 2200/021* (2013.01); *H02S 20/30* (2014.12)

(58) Field of Classification Search
USPC .... 248/562, 566, 636, 127, 161, 162.1, 157; 52/173.3
See application file for complete search history.

(56) References Cited

U.S. PATENT DOCUMENTS

| | | | | |
|---|---|---|---|---|
| 2013/0326969 | A1* | 12/2013 | Kienholz | E04H 9/0215 52/167.2 |
| 2019/0052224 | A1* | 2/2019 | Schatz | F24S 25/12 |
| 2019/0253021 | A1* | 8/2019 | Needham | G01M 9/04 |
| 2021/0277973 | A1* | 9/2021 | Kull | F24S 30/425 |

* cited by examiner

*Primary Examiner* — Alfred J Wujciak
(74) *Attorney, Agent, or Firm* — Schwegman, Lundberg & Woessner, P.A.

(57) ABSTRACT

A supporting and fixing structure and a photovoltaic tracking and mounting system. The supporting and fixing structure includes a main support rod, a mounting rod, a rotary power device and a plurality of auxiliary support rods. The mounting rod is rotatably mounted on the main support rod through the rotary power device. The auxiliary support rods are rotatably matched with the mounting rod. The auxiliary support rod is configured to support the mounting rod. It further includes a valve stem, a housing, an inner housing plate and a plunger rod. The inner housing plate is disposed in the housing, and separates a space in the housing to be two chambers. The plunger rod is movably installed on a housing wall of the housing, and is configured for blocking or communicating the first housing chamber. The valve stem is in sliding and sealing fit with the second housing chamber.

18 Claims, 3 Drawing Sheets

SUPPORT FIXING STRUCTURE AND PHOTOVOLTAIC TRACKING MOUNTING SYSTEM

TECHNICAL FIELD

The disclosure relates to a field of thin plate supporting, in particular to a supporting and fixing structure and a photovoltaic tracking and mounting system.

BACKGROUND ART

Currently, a photovoltaic (or photothermal) tracking frame is an important device for acquiring light energy, but there is a problem in the current photovoltaic tracking frame that in windy weather (in which wind is at less than 5 class), a torsional force may be produced to the main shaft and vibrations produced to loads under action of a pressure difference of the wind on an assembly on the frame. Because the force only acts on one point or several points, the whole tracking system may resonate in severe situations, resulting in damage to the assembly and a mechanical structure of the tracking frame.

In order to avoid the wind (which is at less than 5 class) damaging the tracking frame, a vibration isolation support is installed on the tracking frame, which will produce a reaction force that changes with linear velocity of the vibrations of a photovoltaic assembly caused by the wind pressure to reduce a swinging amplitude of the assembly. However, the vibration isolation support cannot completely eliminate the swinging, and is only useful when the wind is at less than 5 class. In case of squally weather (in which the wind is at greater than 6 class), the wind pressure on both sides of the assembly increases, and the assembly cannot be fixed with telescopic characteristics of the vibration isolation support, which leads to the assembly swinging with the wind, and the assembly will be completely destroyed by the strong wind.

To sum up, in order to prevent the photovoltaic (or photothermal) tracking frame from being damaged in windy weather and squally weather, it is necessary to install a device on the photovoltaic (or photothermal) tracking frame, which device can ensure that it functions to damp like the vibration isolation support in windy weather (in which the wind is at less than 5 class) and to fix the assembly in squally weather (in which the wind is at greater than class 5).

SUMMARY

In view of the above problems, the disclosure provides a supporting and fixing structure and a photovoltaic tracking and mounting system.

Technical schemes adopted in the disclosure are as follows.

A supporting and fixing structure includes a main support rod, a mounting rod, a rotary power device and a plurality of auxiliary support rods. The mounting rod is rotatably mounted at the main support rod through the rotary power device and is perpendicular to the main support rod. An end of each of the auxiliary support rods is rotatably matched with the mounting rod and is perpendicular to the mounting rod. The auxiliary support rods are configured to support the mounting rod. The supporting and fixing structure further includes a valve stem, a housing, an inner housing plate and a plunger rod. The inner housing plate is disposed in the housing, and separates a space in the housing to be a first housing chamber and a second housing chamber which are independent and communicated with each other. The plunger rod is directly or indirectly movably installed at a housing wall of the housing, and the plunger rod is configured for blocking or communicating the first housing chamber through its own movement. The valve stem is in sliding and sealing fit with the second housing chamber and extends through the housing. Both the first housing chamber and the second housing chamber are filled with the damping liquid. The valve stem and the housing are respectively hingedly fitted with the mounting rod and the auxiliary support rod.

This support structure is substantially the same as the existing photovoltaic (or photothermal) tracking frame structure, except a different that a vibration isolation support is installed on the tracking frame structure, while the valve stem and the housing structure are installed for the present structure at an original position where the vibration isolation support is installed. The valve stem and the housing form a damping device.

A working principle of the valve stem and the housing is as follows. Firstly, when the plunger rod does not block the first housing chamber, a damping rod is formed between the valve stem and the housing, and the damping rod acts like the vibration isolation support. In windy weather (in which wind is at less than 5 class) and squally weather (in which wind is at less than 6 class), the plunger rod blocks the first housing chamber and at this time the damping liquid in the housing cannot convect, which is equivalent to form a rod with a fixed length between the valve stem and the housing. This rod with the fixed length connects and fixes the mounting rod and the auxiliary support rod together, which can effectively increase wind resistance of the mounting rod.

In the present device, the damping device is formed by incorporating functions of the valve stem, the housing, the inner housing plate and the plunger rod, and the damping device can mutually switch between function of the damping rod and that of the fixing rod, so that the damping device can be adapted to working conditions of different wind forces.

It should be noted that when the rotary power device drives the mounting rod to rotate, the plunger rod does not block the first housing chamber, and the valve stem and the housing act as a damping device which can function to damp during rotating of the mounting rod.

Optionally, it also includes a powerhead assembly. The powerhead assembly is installed on the housing wall of the housing. The plunger rod is installed on the powerhead assembly, and the powerhead assembly is configured for driving the plunger rod to move on the housing.

Optionally, the valve stem is in sliding and sealing fit with the second housing chamber through its own valve block, and the valve block separates the second housing chamber to be two independent sub-chambers with variable volumes.

Optionally, the valve stem is provided with a first connecting hole and the housing is provided with a second connecting hole. The valve stem is hingedly fitted with the mounting rod through the first connecting hole, and the housing is hingedly fitted with the auxiliary support rods through the second connecting hole.

Optionally, a sealing ring is disposed at the housing, and the sealing ring is configured for sealing a gap between the valve stem and the housing.

The sealing ring is configured to prevent leakage between valve stem and the housing.

Optionally, the rotary power device includes a support frame, a motor and a plurality of gears. The mounting rod is rotatably disposed at the main support rod through the support frame, and the motor and the mounting rod are engaged with each other through the gears.

It is known in the prior art that the support frame, the motor and the gears drive the mounting rod to rotate.

Optionally, a cylinder is disposed at the support frame. The mounting rod is provided with a cylindrical surface, and the mounting rod is rotatably matched with the cylinder through its own cylindrical surface.

Optionally, the cylinder is disposed on the auxiliary support rods. The mounting rod is provided with a cylindrical surface, and the mounting rod is rotationally matched with the cylinder on the auxiliary support rods through its own cylindrical surface.

It is well known in prior art that the auxiliary support rod and the mounting rod are matched with each other through the cylinder and the cylindrical surface.

Optionally, a connecting plate is provided on both the mounting rod and the auxiliary support rods, and the valve stem and the housing are hingedly fitted with the connecting plates.

A photovoltaic tracking and mounting system includes a photovoltaic panel and a supporting and fixing structure. The photovoltaic panel is fixed and installed at a mounting rod.

The photovoltaic panel is installed at the supporting and fixing structure to form the photovoltaic tracking and mounting system.

Optionally, a cross section of the first housing chamber is circular, oval, square or quincunx shape. Or the cross section of the first housing chamber is a combination of circular, triangle and square shapes.

This is a method to change a damping force of the damping liquid in the housing. Other methods to change the damping force of the damping liquid can be to change roughness inside the first housing chamber or a length of the first housing chamber, all of which can change the damping force of the damping liquid in the housing.

The damping device has beneficial effects as follows: the damping device is formed by incorporating functions of the valve stem, the housing, the inner housing plate and the plunger rod, and the damping device can mutually switch between the function of the damping rod and that of the fixing rod, so that the damping device can be adapted to working conditions of different wind forces.

Figure 1:
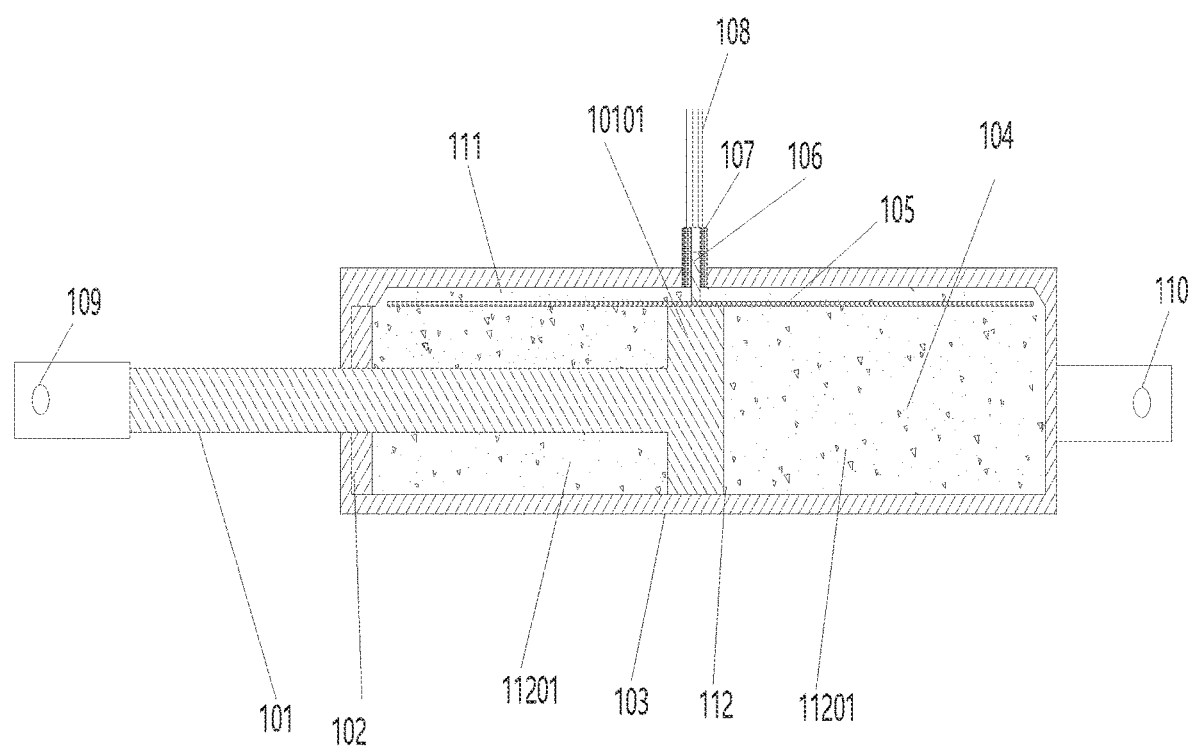
FIG. 1 is a schematic diagram of an installation location relationship of respective components on the housing.

Reference Numerals: 1. Damping Device, 101. Valve Stem, 10101. Valve Block, 102. Sealing Ring, 103. Housing, 104. Damping Liquid, 105. Inner housing plate, 106. Plunger rod, 107. Powerhead Assembly, 108. Electric Wire, 109. First Connecting Hole, 110. Second Connecting Hole, 111. First housing chamber, 112. Second housing chamber, 11201. Sub-chambers, 2, Control Cable, 3. Controller, 401. Main support rod, 402. Auxiliary support rod, 5. Connecting Plate, 6, Mounting rod, 701. Motor, 702. Gear, 703. Support Frame, 704. Cylinder, 8. Photovoltaic Panel.

DETAILED DESCRIPTION

The present disclosure will be described in detail with reference to the accompanying drawings.

Embodiment 1

As shown in FIG. 1, a damping device includes a housing 103 and a valve stem 101 which extends through the housing 103 and is in sliding and sealing fit with the housing 103, and also includes an inner housing plate 105, a plunger rod 106 and a powerhead assembly 107. The inner housing plate 105 is disposed in the housing 103, and the inner housing plate 105 separates a space in the housing 103 to be a first housing chamber 111 and a second housing chamber 112 which are independent and communicated with each other. An end of the valve stem 101 is in sliding and sealing fit with the second housing chamber 112, and the valve stem 101 separates the second housing chamber 112 to be two independent sub-chambers 11201 with variable volumes. The housing 103 is provided with a plunger bore, and the plunger rod 106 is directly or indirectly slidably sealed on the plunger bore. The powerhead assembly 107 is disposed on an outer wall of the housing 103, and the powerhead assembly 107 is configured to drive the plunger rod 106 to move. When the plunger rod 106 is located in the first housing chamber 111, the plunger rod 106 separates the first housing chamber 111 to be two independent compartments. An electric wire 108 for supplying power to the powerhead assembly 107 is connected with the powerhead assembly 107.

Compared with a traditional liquid medium damping rod, in present devices, the inner housing plate 105 is disposed in the housing 103 to separate the space in the housing 103 to be the first housing chamber 111 and the second housing chamber 112 which are independent and communicated with each other. An end of the valve stem 101 is in sliding and sealing fit with a chamber wall of the second housing chamber 112, and a convection of the damping liquid 104 is realized between two sides of the valve stem 101 through the first housing chamber 111. The plunger rod 106 can block or communicate the first housing chamber 111 by its own movement. When the first housing chamber 111 is blocked, the liquid cannot convect between both sides of the valve stem 101, so that the valve stem 101 cannot continue to moving. When the plunger rod 106 moves again and communicates the first housing chamber 111 with the second housing chamber 112 again, the damping liquid 104 can convect between two sides of the valve stem 101 again, so that the valve stem 101 can move again.

With reference to FIG. 1, a working process of the present device is further described. When the plunger rod 106 does not block the first housing chamber 111, there is a limit value for a right moving of the valve stem 101 (i.e., there is also a limit value for compression), because when the valve stem 101 moves to the right, the damping liquid in the right sub-chamber 11201 will flow into the left sub-chamber 11201, but the damping liquid in the housing 103 is pressed (compressed) as the valve stem 101 enters the housing 103. However, there is a limit value for the compression of the damping liquid, and thus there is a limit value for the right movement of the valve stem 101. Similarly, when the plunger rod 106 blocks the first housing chamber 111 and the valve stem 101 moves to the right again, the damping liquid in the right sub-chamber 11201 cannot flow, but will be partially compressed. At this time, the valve stem 101 will move to the right for some distance but cannot continue to move to the right. Similarly, when the valve stem 101 moves to the left, it cannot move further to the left because of negative pressure in the right sub-chamber 11201.

In present device, the inner housing plate 105 is provided to separate the housing 103 to be the first housing chamber 111 and the second housing chamber 112 which are independent and communicated with each other. The plunger rod 106 is moved to communicate or block the damping liquid 104 on both sides of the valve stem 101, which realizes two functions of damping and supporting, and a switching between the two functions is convenient and quick.

As shown in FIG. 1, a valve block 10101 is provided at an end of the valve stem 101, and the valve block 10101 is in sliding and sealing fit with the housing 103 and the inner housing plate 105.

It is well known in prior art that the valve block 10101 is a part of the valve stem 101.

As shown in FIG. 1, the housing 103 is provided with a sealing ring 102 for sealing a gap between the housing 103 and the valve stem 101.

As shown in FIG. 1, the sealing ring 102 is located inside the housing 103.

The sealing ring 102 is configured to prevent leakage between the valve stem 101 and the housing 103.

As shown in FIG. 1, the valve stem 101 is provided with a first connecting hole 109, and the housing 103 is provided with a second connecting hole 110.

The first connecting hole 109 and the second connecting hole 110 are located outside the housing 103.

As shown in FIG. 1, the powerhead assembly 107 is sealed in the plunger bore, the plunger rod 106 is installed on the powerhead assembly 107, and the powerhead assembly 107 is configured to drive the plunger rod 106 to move.

Specifically, there are many ways to realize moving of the plunger rod 106 on the housing 103. The moving of the plunger rod 106 can be realized by an electromagnetic control between the plunger rod 106 and the powerhead assembly 107, or through pushing by a motor or a cylinder.

As shown in FIG. 1, the first housing chamber 111 and the second housing chamber 112 are filled with damping liquid 104.

Embodiment 2: Supporting and Fixing Structure

Figure 2:
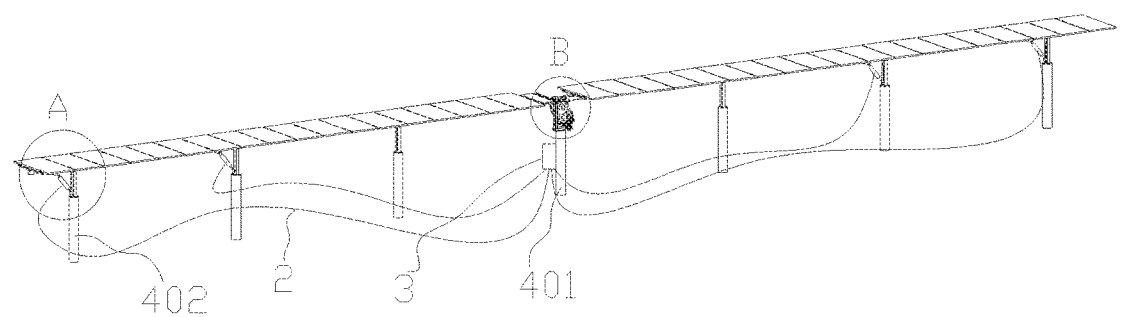
FIG. 2 is a schematic diagram of a supporting and fixing structure.
Figure 3:
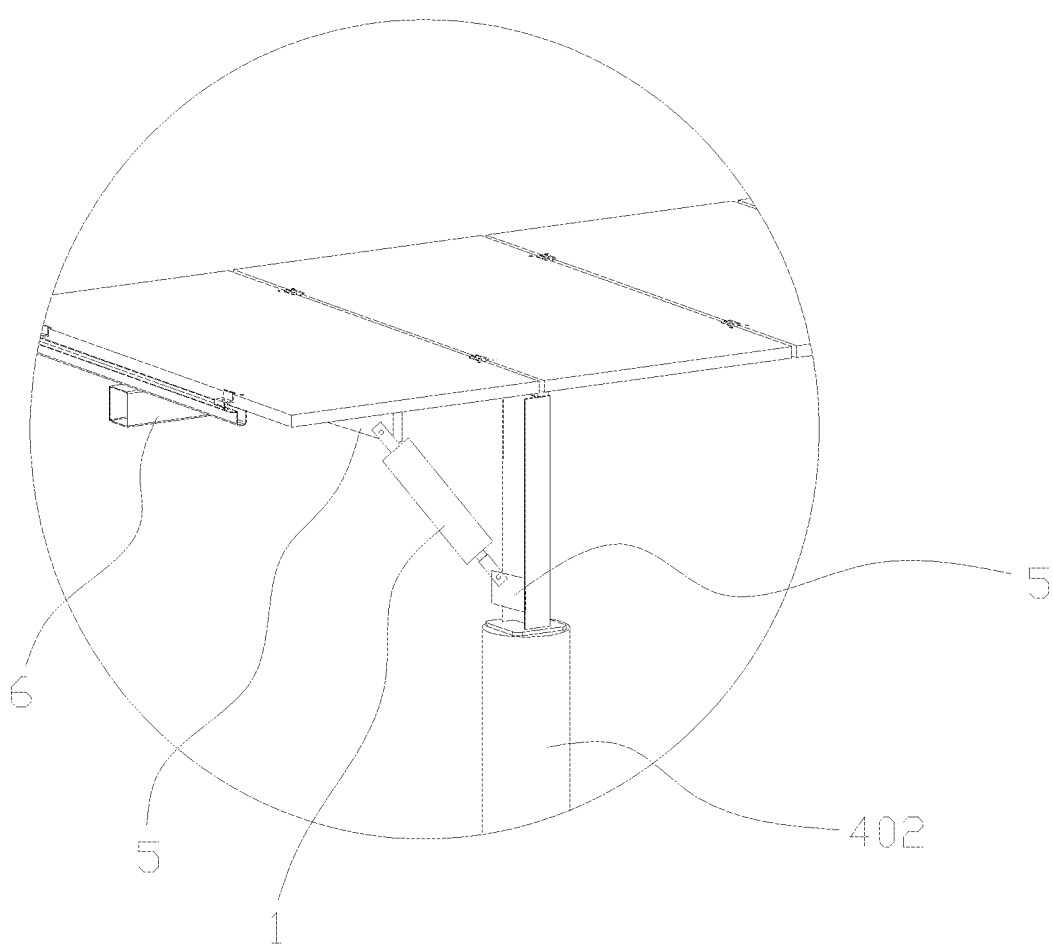
FIG. 3 is an enlarged structural schematic diagram at A in FIG. 2.

Referring to FIGS. 2 and 3, it includes a main support rod 401, a mounting rod 6, a rotary power device and a plurality of auxiliary support rods 402. The mounting rod 6 is rotatably mounted on the main support rod 401 through the rotary power device and is perpendicular to the main support rod 401. An end of each of the auxiliary support rods 402 is rotatably matched with the mounting rod and is perpendicular to the mounting rod 6. The auxiliary support rod 402 is configured to support the mounting rod 6. It further includes the damping device 1 of Embodiment 1. The first connecting hole of the valve stem 101 is hingedly fitted with the connecting plate 5 of the mounting rod 6, and the second connecting hole of the housing 103 is hingedly fitted with the connecting plate 5 of the auxiliary support rod 402.

This support structure is substantially the same as the existing photovoltaic (or photothermal) tracking frame structure, except a different that a vibration isolation support is installed on the tracking frame structure, while the valve stem 101 and the housing structure 103 are installed for the present structure at an original position where the vibration isolation support is installed. The valve stem 101 and the housing 103 form the damping device 1, a structure of which is as in Embodiment 1.

A working principle of the damping device 1 is as follows. Firstly, when the plunger rod does not block the first housing chamber, a damping rod is formed for the damping device 1, and the damping rod acts like the vibration isolation support. In windy weather (in which wind is at less than 5 class) and squally weather (in which wind is at less than 6 class), the plunger rod blocks the first housing chamber and at this time the damping liquid in the housing 103 cannot convect, which is equivalent to forming a rod with a fixed length between the valve stem 101 and the housing 103. This rod with the fixed length connects and fixes the mounting rod 6 and the auxiliary support rod 402 together, which can effectively increase wind resistance of the mounting rod 6.

It should be noted that when the rotary power device drives the mounting rod 6 to rotate, the plunger rod does not block the first housing chamber, and The damping device 1 can function to damp during rotating of the mounting rod 6.

Figure 4:
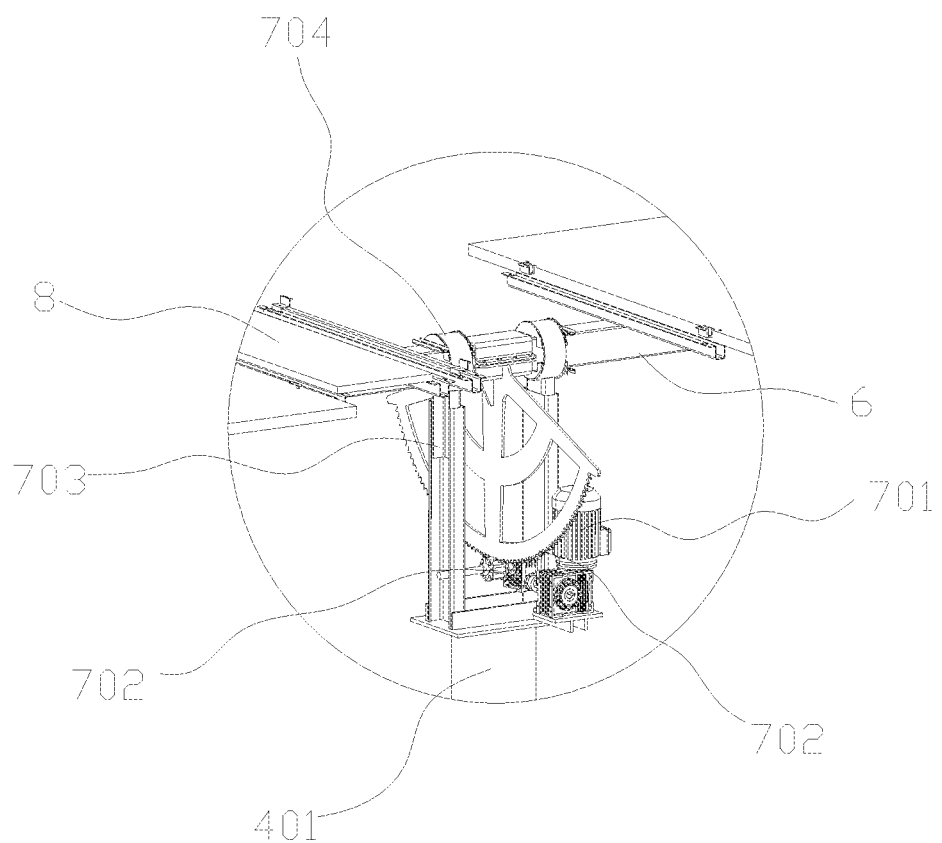
FIG. 4 is an enlarged structural schematic diagram at B in FIG. 2.

Referring to FIGS. 2 and 4, the rotary power device includes a support frame 703, a motor 701 and a plurality of gears 702. The mounting rod 6 is rotatably disposed on the main support rod 401 through the support frame 703, and the motor 701 and the mounting rod 6 are engaged with each other through the gears 702.

It is known in the prior art that the support frame 703, the motor 701 and the gears 702 drive the mounting rod 6 to rotate.

Specifically, in order to control the motor 701 and the powerhead on the damping device, a controller 3 is provided in the whole mounting structure, and the controller 3 is connected with the motor 701 and the powerhead through a control cable 2.

As shown in FIGS. 2 and 4, a cylinder 704 is disposed on the support frame 703. The mounting rod 6 is provided with a cylindrical surface, and the mounting rod 6 is rotatably matched with the cylinder 704 through its own cylindrical surface.

As shown in FIG. 2, the cylinder 704 is disposed on the auxiliary support rod 402. The mounting rod 6 is provided with a cylindrical surface, and the mounting rod 6 is rotationally matched with the cylinder on the auxiliary support rod 402 through its own cylindrical surface.

It is well known in prior art that the auxiliary support rod 402 and the mounting rod 6 are matched with each other through the cylinder 704 and the cylindrical surface.

In Embodiment 3, a photovoltaic tracking and mounting system includes a photovoltaic panel 8 and a supporting and fixing structure. The photovoltaic panel 8 is fixed and installed on a mounting rod 6.

The photovoltaic panel 8 is installed on the supporting and fixing structure to form the photovoltaic tracking and mounting system.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

We claim:

1. A supporting and fixing structure comprising a main support rod, a mounting rod, a rotary power device and a plurality of auxiliary support rods, the mounting rod being rotatably mounted at the main support rod through the rotary power device and the mounting rod being perpendicular to the main support rod, an end of each of the auxiliary support rods being rotatably matched with the mounting rod and the auxiliary support rods being perpendicular to the mounting rod, and the auxiliary support rods being configured to support the mounting rod, wherein the supporting and fixing structure further comprises a valve stem, a housing, an inner housing plate and a plunger rod, the inner housing plate is disposed in the housing, and the inner housing plate separates a space in the housing to be a first housing chamber and a second housing chamber which are independent and communicated with each other, the plunger rod is directly or indirectly movably installed at a housing wall of the housing and the plunger rod is configured for blocking or communicating the first housing chamber through a movement of the plunger rod, the valve stem is in sliding and sealing fit with the second housing chamber and the valve stem extends through the housing, both the first housing chamber and the second housing chamber are filled with a damping liquid, and the valve stem and the housing are respectively hingedly fitted with the mounting rod and the auxiliary support rods.

2. The supporting and fixing structure according to claim 1, further comprising a powerhead assembly, wherein the powerhead assembly is installed on the housing wall of the housing, the plunger rod is installed on the powerhead assembly, and the powerhead assembly is configured for driving the plunger rod to move on the housing.

3. The supporting and fixing structure according to claim 1, wherein the valve stem is in sliding and sealing fit with the second housing chamber through a valve block of the valve stem, and the valve block separates the second housing chamber to be two independent sub-chambers with variable volumes.

4. The supporting and fixing structure according to claim 1, wherein the valve stem is provided with a first connecting hole and the housing is provided with a second connecting hole, the valve stem is hingedly fitted with the mounting rod through the first connecting hole, and the housing is hingedly fitted with the auxiliary support rods through the second connecting hole.

5. The supporting and fixing structure according to claim 1, wherein a sealing ring is disposed at the housing, and the sealing ring is configured for sealing a gap between the valve stem and the housing.

6. The supporting and fixing structure according to claim 1, wherein the rotary power device comprises a support frame, a motor and a plurality of gears, the mounting rod is rotatably disposed at the main support rod through the support frame, and the motor and the mounting rod are engaged with each other through the gears.

7. The supporting and fixing structure according to claim 6, wherein a cylinder is disposed at the support frame, the mounting rod is provided with a cylindrical surface, and the mounting rod is rotatably matched with the cylinder through the cylindrical surface of the mounting rod.

8. The supporting and fixing structure according to claim 1, wherein a cylinder is disposed on each of the auxiliary support rods, the mounting rod is provided with a cylindrical surface, and the mounting rod is rotationally matched with the cylinder on the auxiliary support rods through cylindrical surface of the mounting rod.

9. The supporting and fixing structure according to claim 1, wherein a connecting plate is provided on both the mounting rod and the auxiliary support rods, and the valve stem and the housing are hingedly fitted with the connecting plates.

10. A photovoltaic tracking and mounting system comprising a photovoltaic panel, wherein the photovoltaic tracking and mounting system further comprises a supporting and fixing structure
wherein the supporting and fixing structure comprises a main support rod, a mounting rod, a rotary power device and a plurality of auxiliary support rods, the mounting rod is rotatably mounted at the main support rod through the rotary power device and the mounting rod is perpendicular to the main support rod, an end of each of the auxiliary support rods is rotatably matched with the mounting rod and the auxiliary support rods is perpendicular to the mounting rod, and the auxiliary support rods is configured to support the mounting rod, wherein the supporting and fixing structure further comprises a valve stem, a housing, an inner housing plate and a plunger rod, the inner housing plate is disposed in the housing, and the inner housing plate separates a space in the housing to be a first housing chamber and a second housing chamber which are independent and communicated with each other, the plunger rod is directly or indirectly movably installed at a housing wall of the housing and the plunger rod is configured for blocking or communicating the first housing chamber through a movement of the plunger rod, the valve stem is in sliding and sealing fit with the second housing chamber and the valve stem extends through the housing, both the first housing chamber and the second housing chamber are filled with a damping liquid, and the valve stem and the housing are respectively hingedly fitted the mounting rod and the auxiliary support rod, wherein each auxiliary support rods comprise the valve stem and housing; and the photovoltaic panel is fixedly installed at the mounting rod.

11. The photovoltaic tracking and mounting system according to claim 10
wherein the supporting and fixing structure further comprises a powerhead assembly, the powerhead assembly is installed on the housing wall of the housing, the plunger rod is installed on the powerhead assembly, and the powerhead assembly is configured for driving the plunger rod to move on the housing.

12. The photovoltaic tracking and mounting system according to claim 10, wherein the valve stem is in sliding and sealing fit with the second housing chamber through a valve block of the valve stem, and the valve block separates the second housing chamber to be two independent sub-chambers with variable volumes.

13. The photovoltaic tracking and mounting system according to claim 10, wherein the valve stem is provided with a first connecting hole and the housing is provided with a second connecting hole, the valve stem is hingedly fitted with the mounting rod through the first connecting hole, and the housing is hingedly fitted with the auxiliary support rods through the second connecting hole.

14. The photovoltaic tracking and mounting system according to claim 10, wherein a sealing ring is disposed at the housing, and the sealing ring is configured for sealing a gap between the valve stem and the housing.

15. The photovoltaic tracking and mounting system according to claim 10, wherein the rotary power device comprises a support frame, a motor and a plurality of gears, the mounting rod is rotatably disposed at the main support rod through the support frame, and the motor and the mounting rod are engaged with each other through the gears.

16. The photovoltaic tracking and mounting system according to claim 15, wherein a cylinder is disposed at the support frame, the mounting rod is provided with a cylindrical surface, and the mounting rod is rotatably matched with the cylinder through the cylindrical surface of the mounting rod.

17. The photovoltaic tracking and mounting system according to claim 10, wherein a cylinder is disposed on each of the auxiliary support rods, the mounting rod is provided with a cylindrical surface, and the mounting rod is rotationally matched with the cylinder on the auxiliary support rods through the cylindrical surface of the mounting rod.

18. The photovoltaic tracking and mounting system according to claim 10, wherein a connecting plate is provided on both the mounting rod and the auxiliary support rods, and the valve stem and the housing are hingedly fitted with the connecting plates.

\* \* \* \* \*